(12) United States Patent
Hitomi et al.

(10) Patent No.: US 6,941,905 B2
(45) Date of Patent: *Sep. 13, 2005

(54) CONTROL UNIT FOR SPARK IGNITION-TYPE ENGINE

(75) Inventors: Mitsuo Hitomi, Fuchu-cho (JP); Kouji Asanomi, Fuchu-cho (JP); Toshiaki Nishimoto, Fuchu-cho (JP); Taketoshi Yamauchi, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 6 days.

This patent is subject to a terminal disclaimer.

(21) Appl. No.: 10/668,962

(22) Filed: Sep. 24, 2003

(65) Prior Publication Data

US 2004/0060527 A1 Apr. 1, 2004

(30) Foreign Application Priority Data

Sep. 30, 2002 (JP) ...................... 2002-287802

(51) Int. Cl.⁷ .............................. F02M 25/07
(52) U.S. Cl. ................... 123/58.8; 123/568.11
(58) Field of Search ............... 123/58.8, 64

(56) References Cited

U.S. PATENT DOCUMENTS

| | | | |
|---|---|---|---|
| 4,194,472 A | | 3/1980 | Amano et al. |
| 4,237,832 A | * | 12/1980 | Hartig et al. .............. 123/58.8 |
| 6,073,600 A | | 6/2000 | Ma |
| 6,138,650 A | * | 10/2000 | Bailey .................... 123/568.12 |
| 6,178,933 B1 | * | 1/2001 | Lavy ......................... 123/58.8 |
| 6,308,666 B1 | * | 10/2001 | Drecq ....................... 123/58.8 |
| 6,386,154 B1 | * | 5/2002 | Hellman et al. ........... 123/58.8 |
| 6,425,381 B1 | * | 7/2002 | Rammer ................ 123/568.12 |
| 6,431,128 B1 | * | 8/2002 | Dabadie .................... 123/58.8 |

OTHER PUBLICATIONS

Patent Abstract of Japan vol. 012, No. 315 (M–735), Aug. 26, 1988 & JP 63 088257 A (Keihin Seiki MFG Co Ltd) Apr. 19, 1988 *Abstract*.

European Search Report Dated Dec. 18, 2003.

* cited by examiner

*Primary Examiner*—Henry C. Yuen
*Assistant Examiner*—Jason Benton
(74) *Attorney, Agent, or Firm*—Nixon Peabody LLP; Donald R. Studebaker

(57) ABSTRACT

In a partial load range of the engine, control of the flowing state of sucked and discharged gas is executed between a pair of cylinders, an exhaust stroke of one of the cylinders overlapping with an intake stroke of the other, so that burnt gas discharged from preceding cylinders 2A, 2D on the exhaust-stroke side is introduced, in a state where it has been discharged, through an inter-cylindrical gas passage 22 into following cylinders 2B, 2C on the intake stroke side. In a higher load range than the partial load range, control is executed so that a fresh-air introducing valve 18 disposed in a fresh-air introduction passage of the following cylinders 2B, 2C is opened, both the burnt gas and fresh air are introduced into the following cylinders 2B, 2C, and fuel is supplied to conduct combustion in the following cylinders 2B, 2C.

5 Claims, 9 Drawing Sheets

CONTROL UNIT FOR SPARK IGNITION-TYPE ENGINE

BACKGROUND OF THE INVENTION

1. Field of the Invention

This invention relates to a control unit for a spark ignition-type engine, more specifically, a control unit for controlling the state of combustion in each cylinder of a multi-cylinder engine which is capable of improving fuel efficiency and exhaust emissions.

2. Description of the Related Art

In a conventionally-known spark ignition-type engine which is capable of improving fuel efficiency, combustion is conducted with the air-fuel ratio of a mixture inside each cylinder being kept at a lean air-fuel ratio higher than a stoichiometric ratio. Particularly, in an engine which is provided with a fuel injection valve for injecting fuel directly into a combustion chamber, stratified charge combustion is conducted by injecting fuel from the fuel injection valve in a lower speed & lower-load range or the like at a compression stroke, leading to the realization of a super-lean burn (for example, refer to Japanese Patent Laid-Open No. 10-29836).

In such an engine, however, only an ordinary three-way catalyst used to purify exhaust gas (having a high capability to remove HC, CO and $NO_x$ at and around a stoichiometric ratio) is inadequate to remove $NO_x$ at the time of a lean operation. As shown in Japanese Patent Laid-Open No. 10-29836, therefore, a lean $NO_x$ catalyst is provided which absorbs $NO_x$ in an oxygen-excess atmosphere and removes and reduces $NO_x$ in a lowered oxygen-concentration atmosphere. In the case where such a lean $NO_x$ catalyst is used, when the quantity of $NO_x$ that the lean $NO_x$ catalyst absorbs during a lean operation increases, for example, as shown in Japanese Patent Laid-Open No. 10-29836, additional fuel is injected during an expansion stroke, in addition to main combustion. Thereby, the air-fuel ratio of exhaust gas is made rich and CO is formed, promoting the removal and reduction of $NO_x$.

Problems to be Solved by the Invention:

In an engine which conducts such a conventional lean operation as mentioned above, the lean $NO_x$ catalyst needs to be provided in an exhaust passage so that its purification capability for $NO_x$ can be secured during the lean operation, resulting in a rise in expenses. Furthermore, as mentioned above, when the quantity of $NO_x$ that the lean $NO_x$ catalyst absorbs increases, $NO_x$ has to be removed and reduced so that the purification capability of the lean $NO_x$ catalyst for $NO_x$ can be maintained. This requires making the air-fuel ratio temporarily rich by supplying additional fuel and other means. Furthermore, if fuel to be used is sulfuric, sulfurous poisoning has to be eliminated from the lean $NO_x$ catalyst. This needs regeneration processing such as heating the catalyst and supplying a reducing agent, causing the fuel-efficiency improving effect to decrease. Furthermore, if the air-fuel ratio of a mixture becomes leaner than a certain level, that makes the burning velocity too slow, hindering combustion shortly before its completion from working normally. As a result, there is a limit to the improvement of fuel efficiency through making the air-fuel ratio lean under stratified charge combustion.

In consideration of the aforementioned problems, the present applicant has filed an application related to a control unit for a spark ignition-type engine which is capable of keeping the good effect of a lean burn on fuel efficiency and improving its exhaust purification capability only by using a three-way catalyst (Japanese Patent Application No. 2002-024548).

The present invention, based on this kind of art, provides a control unit for a spark ignition-type engine which is capable of securing an exhaust purification capability and improving fuel efficiency more effectively.

SUMMARY OF THE INVENTION

In order to solve the aforementioned problems, according to the present invention, a control unit for a multi-cylinder spark ignition-type engine according to a first aspect of the present invention, in which a combustion cycle of each cylinder has a predetermined phase difference, and said engine including:

an inter-cylindrical gas passage between a pair of cylinders, an exhaust stroke of one of the cylinders and an intake stroke of the other of the cylinders overlapping each other, and through the inter-cylindrical gas passage, burnt gas discharged from the preceding cylinder at the exhaust stroke being introduced into the following cylinder at the intake stroke;

a switching valve for switching the direction in which the burnt gas of the preceding cylinder is introduced, from the side of an exhaust passage to the side of the inter-cylindrical gas passage and vice versa;

a fresh-air introducing valve for introducing fresh air into the following cylinder by opening and closing a fresh-air introduction passage;

said control unit comprising the following elements:

an operation-mode controlling means for: executing control of a special operation mode in a partial load range of the engine, in the special operation mode, the fresh-air introducing valve being closed and the switching valve being controlled so that the whole burnt gas discharged from the preceding cylinder can be introduced onto the inter-cylindrical gas-passage side, thereby the two cylinders being kept connected, the air-fuel ratio in the preceding cylinder becoming a lean air-fuel ratio higher than a stoichiometric ratio and combustion being conducted, and fuel being supplied to the burnt gas having the lean air-fuel ratio introduced from the preceding cylinder into the following cylinder to conduct combustion in the following cylinder; and executing control of a medium operation mode in a higher load range than the partial load range, in the medium operation mode, the fresh-air introducing valve being opened to introduce both the burnt gas and fresh air into the following cylinder and fuel being supplied to conduct combustion in the following cylinder; and an air-fuel-ratio controlling means for controlling the air-fuel ratio in the following cylinder so that the concentration of oxygen in exhaust gas discharged from the following cylinder can be a value corresponding to a combustion state at a stoichiometric ratio.

According to the first aspect of the present invention, in a partial load range of the engine, fuel control of the special operation mode is executed with the two cylinders being connected. Thereby, in the following cylinder, a lean burn improves thermal efficiency and reduces pumping loss, helping improve fuel efficiency. In the preceding cylinder, fuel is supplied into burnt gas introduced from the preceding cylinder until it reaches a stoichiometric ratio, and then, combustion is conducted at the stoichiometric ratio. This, at least, allows pumping loss to reduce, thus improving fuel efficiency. Since the exhaust gas burned at the stoichiometric ratio is introduced into the exhaust passage, there is no need to use any lean $NO_x$ catalyst. Sufficient exhaust conversion capabilities can be obtained by using a three-way catalyst or an oxidation catalyst. On the other hand, in a higher load range than the partial load range, the fresh-air introducing valve is opened, and then, fresh air is introduced into the following cylinder. This makes good the shortage of fresh air in the following cylinder, helping conduct combustion properly in the following cylinder.

These and other objects, features, and advantages of the present invention will become more apparent upon reading the following detailed description along with the accompanying drawings.

BRIEF DESCRIPTION OF THE DRAWINGS

FIG. 2 is a schematic plan view showing a rough configuration of an main body of the engine and the like.

FIG. 5 is an operational diagram showing an exhaust stroke and an intake stroke of each cylinder, the timing of fuel injection, the timing of ignition and the like.

DETAILED DESCRIPTION OF INVENTION

Figure 1:
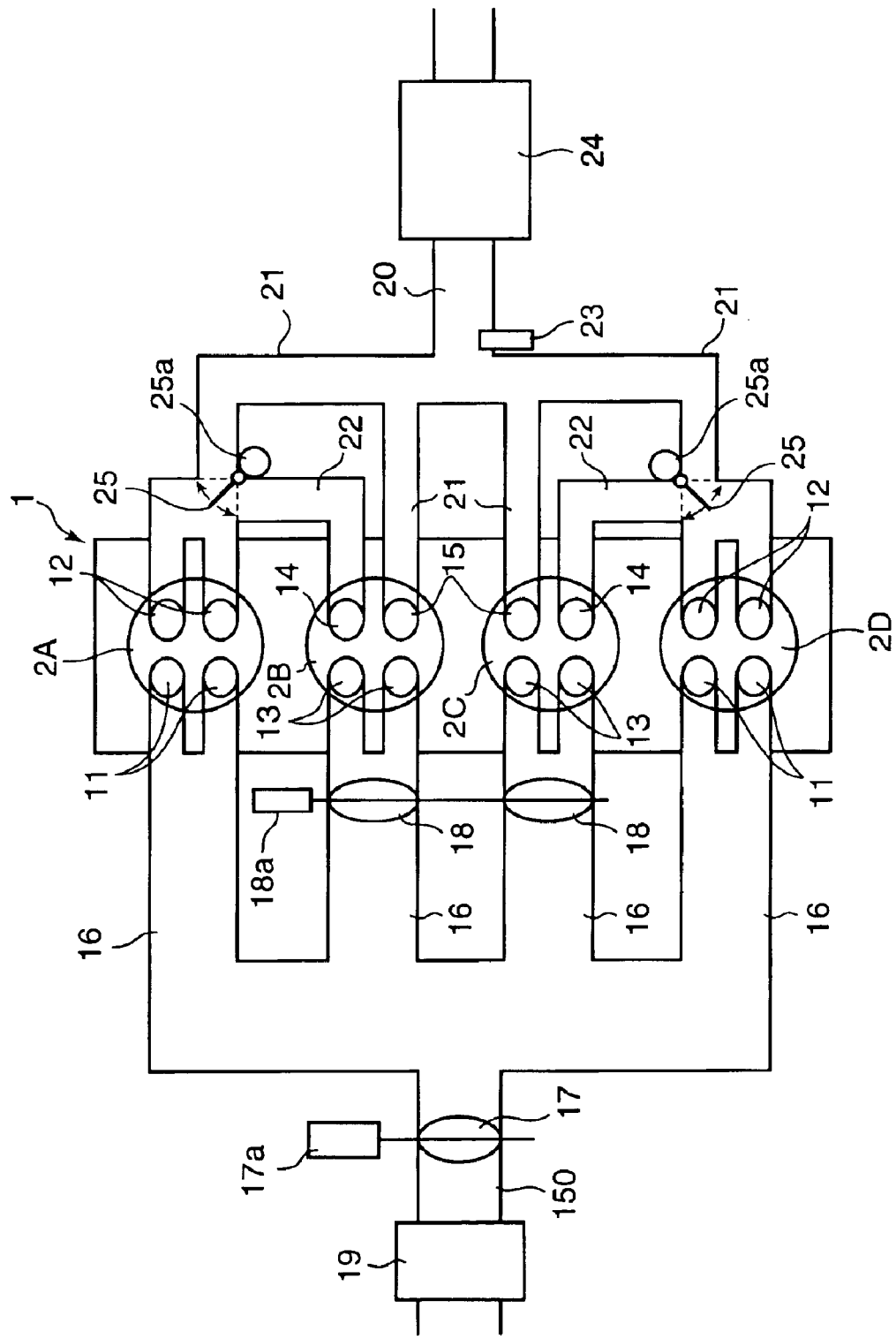
FIG. 1 is a schematic plan view showing the whole of an engine including a control unit according to an embodiment of the present invention.
Figure 2:
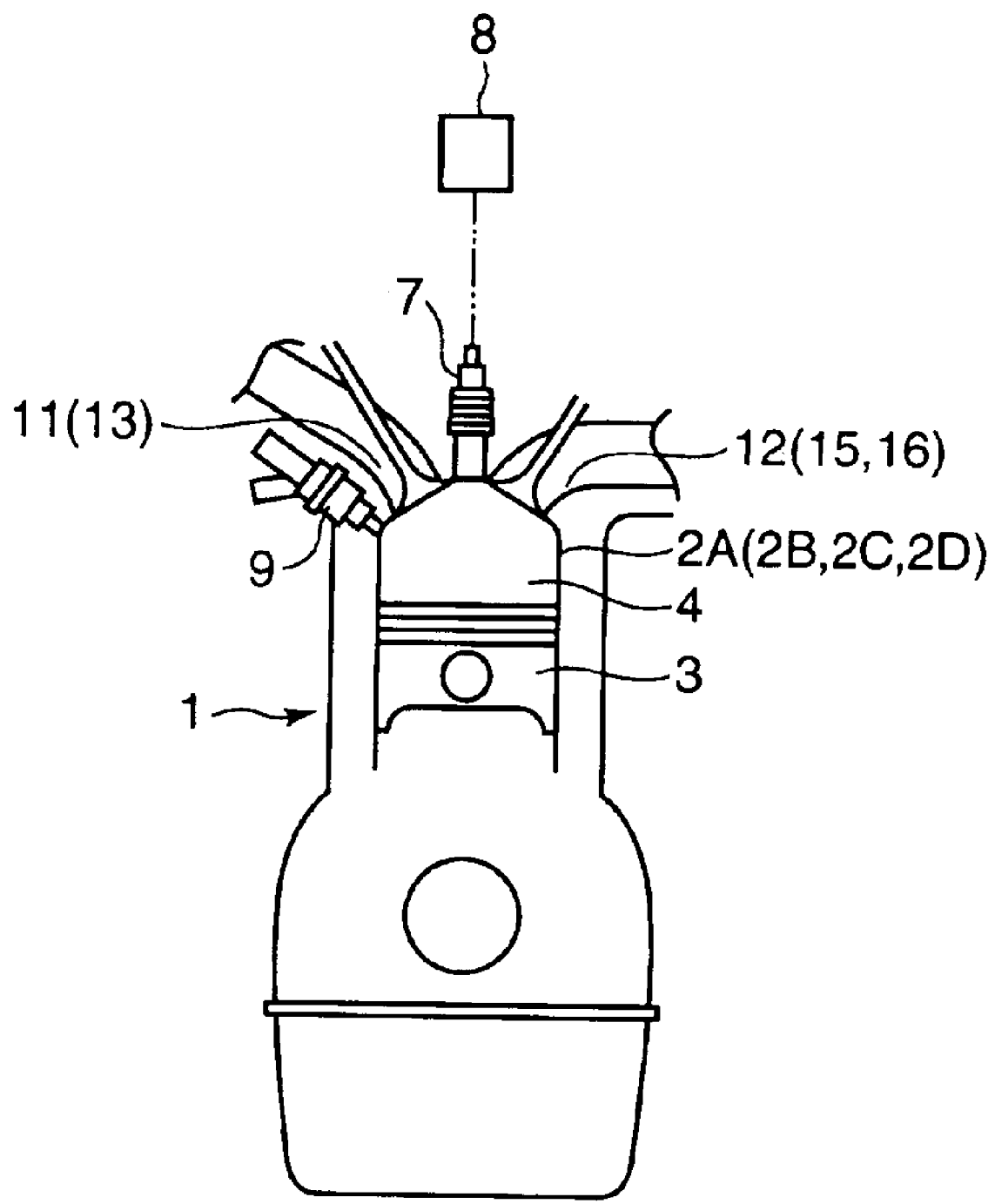

FIG. 1 and FIG. 2 show a rough configuration of the engine according to an embodiment of the present. In these figures, an engine main body 1 includes a plurality of cylinders. Specifically, it includes four cylinders 2A to 2D according to the embodiment shown in the figures. A piston 3 is inserted into each cylinder 2A to 2D. A combustion chamber 4 is formed over the piston 3.

A spark plug 7 is disposed at the top part of the combustion chamber 4 formed in each cylinder 2A to 2D. The tip of the spark plug 7 faces the inside of the combustion chamber 4. To the spark plug 7 is connected an ignition control circuit 8 which can control ignition timing through its electronic control.

At a side part of the combustion chamber 4, a fuel injection valve 9 is provided which injects fuel directly into the combustion chamber 4. The fuel injection valve 9 houses a needle valve and a solenoid (not shown). A pulse signal is inputted in the fuel injection valve 9 from a fuel-injection controlling means (mentioned later). Thereby, the fuel injection valve 9 is driven and opened by the period of time corresponding to a pulse length at the time of the pulse input. Then, the fuel injection valve 9 injects the quantity of fuel corresponding to its opening period of time. Herein, fuel is supplied to the fuel injection valve 9 by means of a fuel supplying system (not shown). The fuel supplying system includes a fuel pump, a fuel supply passage and the like. It can give a fuel pressure higher than the pressure inside the combustion chamber at a compression stroke.

Figure 5:
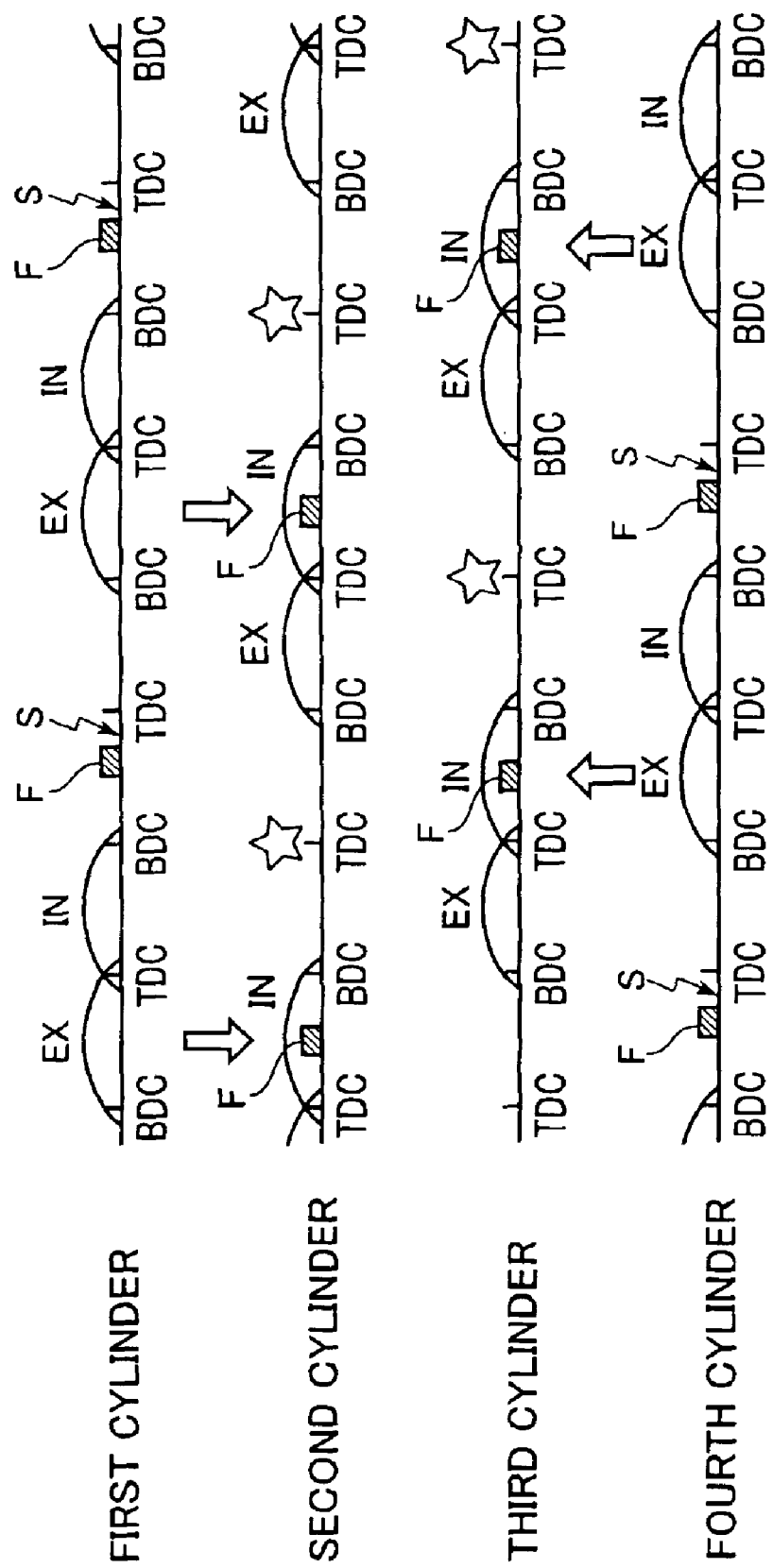

A combustion cycle, which is made up of intake, compression, expansion and exhaust strokes, is constructed so that it can be conducted with each cylinder 2A to 2D keeping a predetermined phase difference. Specifically, in the case of a four-cylinder engine, as shown in FIG. 5, the combustion cycle is conducted with a first cylinder 2A, a third cylinder 2C, a fourth cylinder 2D and a second cylinder 2B, in the mentioned order, keeping the phase difference of a 180-degree crank angle. Herein, the first cylinder 2A, the second cylinder 2B, the third cylinder 2C and the fourth cylinder 2D are designated in the mentioned order from one end in the direction of a cylindrical row. In FIG. 5, reference character EX denotes the exhaust stroke; IN, the intake stroke; F, fuel injection; and S, forced ignition. An asterisk in the figure shows that compressive self-ignition is conducted.

An inter-cylindrical gas passage 22 is provided between a pair of cylinders. Herein, an exhaust stroke of one of the cylinders and an intake stroke of the other overlap each other. When the exhaust stroke overlaps with the intake stroke, burnt gas can be led from the cylinder on the exhaust-stroke side (referred to as preceding cylinder in the present specification) to the cylinder on the intake stroke side (referred to as following cylinder in the present specification) through the inter-cylindrical gas passage 22. In the four-cylinder engine according to this embodiment, as shown in FIG. 5, the exhaust stroke (EX) of the first cylinder 2A overlaps with the intake stroke (IN) of the second cylinder 2B, and the exhaust stroke (EX) of the fourth cylinder 2D overlaps with the intake stroke (IN) of the third cylinder 2C. Thus, the first cylinder 2A and the second cylinder 2B make a pair; the fourth cylinder 2D and the third cylinder 2C pair up. In other words, the first cylinder 2A and the fourth cylinder 2D are set to become preceding cylinders; the second cylinder 2B and the third cylinder 2C are set to become following cylinders.

Next, the configuration of intake and exhaust ports of each cylinder, a intake passage and an exhaust passage connected to the ports, and the inter-cylindrical gas passage, will be explained in the concrete below.

A pair of intake ports 11, 11 used to introduce fresh air and a pair of exhaust ports 12, 12 used to introduce burnt gas (or exhaust gas) into an exhaust passage 20 or the inter-cylindrical gas passage 22, are provided in each of the first cylinder 2A and the fourth cylinder 2D set as the preceding cylinders.

In each of the second cylinder 2B and the third cylinder 2C set as the following cylinders, there are provided a pair of first intake ports 13, 13 used to introduce fresh air, a second intake port 14 used to introduce burnt gas from the preceding cylinders 2A, 2D and an exhaust port 15 used to introduce burnt gas into the exhaust passage 20.

According to the example shown in FIG. 1, the pair of intake ports 11, 11 are disposed side by side in the left-half part of a combustion chamber of each of the preceding cylinders (or the first and fourth cylinders) 2A, 2D. In the right-half part of the combustion chamber, the pair of exhaust ports 12, 12 are disposed side by side. In the following cylinders (or the second and third cylinders) 2B, 2C, the pair of first intake ports 13, 13 are disposed side by side in the left-half part of each of their combustion chambers. The second intake port 14 and the exhaust port 15 are disposed side by side in the right-half part of each combustion chamber.

A branch intake passage 16 for each cylinder in a intake passage 150 is connected at its downstream end to the pair of intake ports 11, 11 provided in the preceding cylinders 2A, 2D and the pair of first intake ports 13, 13 provided in the following cylinders 2B, 2C. A throttle valve 17 configured by a butterfly valve is disposed at an upstream shared intake passage-part of the intake passage 150. Herein, the upstream shared intake passage-part is close to the part where the intake passage 150 branches off. An actuator 17a opens and closes the throttle valve 17 so as to control the quantity of air which the whole engine sucks in.

A fresh-air introducing valve 18 is provided in a fresh-air introduction passage configured by the branch intake passage 16 connected to the first intake ports 13, 13 of the following cylinders 2B, 2C. The fresh-air introducing valve 18 is configured by a pair of butterfly valves which move together with each other on their common axis. An actuator 18a turns the fresh-air introducing valve 18 around the common axis. Thereby, the fresh-air introduction passage is opened and closed to control the quantity of air sucked into the following cylinders 2B, 2C. In addition, if the fresh-air introducing valve 18 is closed, that stops the introduction of fresh air into the following cylinders 2B, 2C. Herein, an air-flow sensor 19 for detecting the quantity of flowing intake air is disposed at an upstream supply intake passage-part of the intake passage 150 which is close to the part where the intake passage 150 branches off.

A branch exhaust passage 21 for each cylinder in the exhaust passage 20 is connected at its upstream end to the pair of exhaust ports 12, 12 provided in the preceding cylinders 2A, 2D and the single exhaust port 15 provided in the following cylinders 2B, 2C. To the branch exhaust passage 21 connected to the exhaust ports 12, 12 of the preceding cylinders 2A, 2D, the inter-cylindrical gas passage 22 is connected at its upstream end. The inter-cylindrical gas passage 22 is connected at its downstream end to the second intake port 14 of the following cylinders 2B, 2C. Herein, the inter-cylindrical gas passage 22 is a relatively short passage connecting cylinders next to each other. This helps relatively lessen the quantity of heat radiated while the gas discharged from the preceding cylinders 2A, 2D is passing through the inter-cylindrical gas passage 22.

A switching valve 25 configured by a butterfly valve is disposed at the part where the branch exhaust passage 21 leading to the exhaust ports 12, 12 of the preceding cylinders 2A, 2D is connected to the inter-cylindrical gas passage 22. The switching valve 25 switches the direction in which the burnt gas discharged from the preceding cylinders 2A, 2D flows out, between the side of the downstream-part (joining-part) of the exhaust passage 20 and the side of the inter-cylindrical gas passage 22. An actuator 25a turns the switching valve 25 to its three predetermined positions. If the switching valve 25 closes the part leading to the exhaust passage 20, the entire burnt gas is introduced onto the side of the inter-cylindrical gas passage 22. This is a position at which two cylinders communicate with each other. If it closes the side of the inter-cylindrical gas passage 22, the entire burnt gas is introduced onto the side of the exhaust passage 20. This is a position at which each cylinder becomes independent. The third position is a neutral position where the burnt gas is introduced into both the inter-cylindrical gas passage 22 and the exhaust passage 20. Opening levels of the switching valve 25 can be changed at the neutral position, so that the distribution ratio can be adjusted between the quantity of the burnt gas introduced onto the side of the inter-cylindrical gas passage 22 and that onto the joining-part side of the exhaust passage 20.

The exhaust passage 20 is provided with an $O_2$ sensor 23, which is disposed at a joining part of the downstream location of the branch exhaust passage 21. Herein, the $O_2$ sensor 23 detects the concentration of oxygen in exhaust gas to detect its air-fuel ratio. The exhaust passage 20 is also provided with a three-way catalyst 24 used to purify exhaust gas, which is disposed downstream from the location of the $O_2$ sensor 23. It is generally known that the three-way catalyst 24 is a catalyst having a high purification capability for HC, CO and $NO_x$ when the air-fuel ratio of exhaust gas is nearly equal to a stoichiometric ratio (or excess air factor $\lambda=1$).

Figure 3:
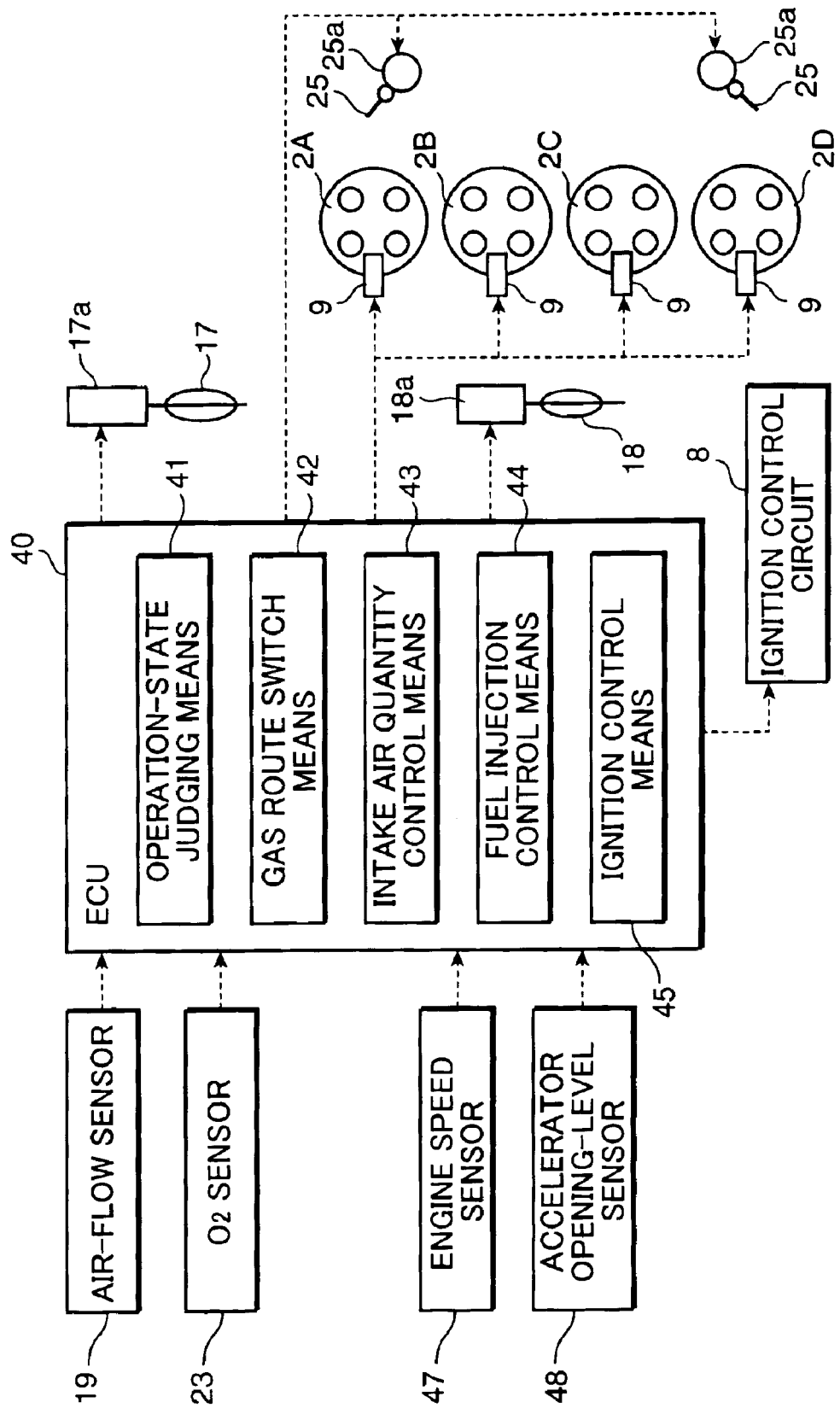
FIG. 3 is a block diagram showing a control system.

As shown in FIG. 3, the above described engine is provided with an ECU (electronic control unit) 40 used to control the engine. Herein, the ECU 40 is configured by a microcomputer and the like. Signals from the air-flow sensor 19 and the $O_2$ sensor 23 are inputted in the ECU 40. Signals are also inputted in the ECU 40 from a engine speed sensor 47 for detecting the engine speed (RPM), aimed at judging how the engine is operating. In addition, signals are also inputted from an accelerator opening-level sensor 48 for detecting the opening level of an accelerator (or the depth to which the driver is stepping on an accelerator pedal), or the like. The ECU 40 outputs control signals to each fuel injection valve 9, the actuator 17a of the multiple throttle valve 17, the actuator 18a of the fresh-air introducing valve 18 and the actuator 25a of the switching valve 25.

The ECU 40 includes an operation-state judging means 41 for judging how the engine is operating; a gas-route switching means 42 for switching the route on which fresh air is introduced into each cylinder 2A to 2C and the route on which burnt gas is introduced from each cylinder 2A to 2C; a intake air quantity controlling means 43 for controlling the quantity of flowing air to be sucked by each cylinder 2A to 2D; a fuel-injection controlling means 44 for controlling the quantity of fuel to be injected from the fuel injection valve 9 and the timing of fuel injection; and an ignition controlling means 45 for controlling the timing in which the spark plug 7 ignites a mixture.

Figure 4:
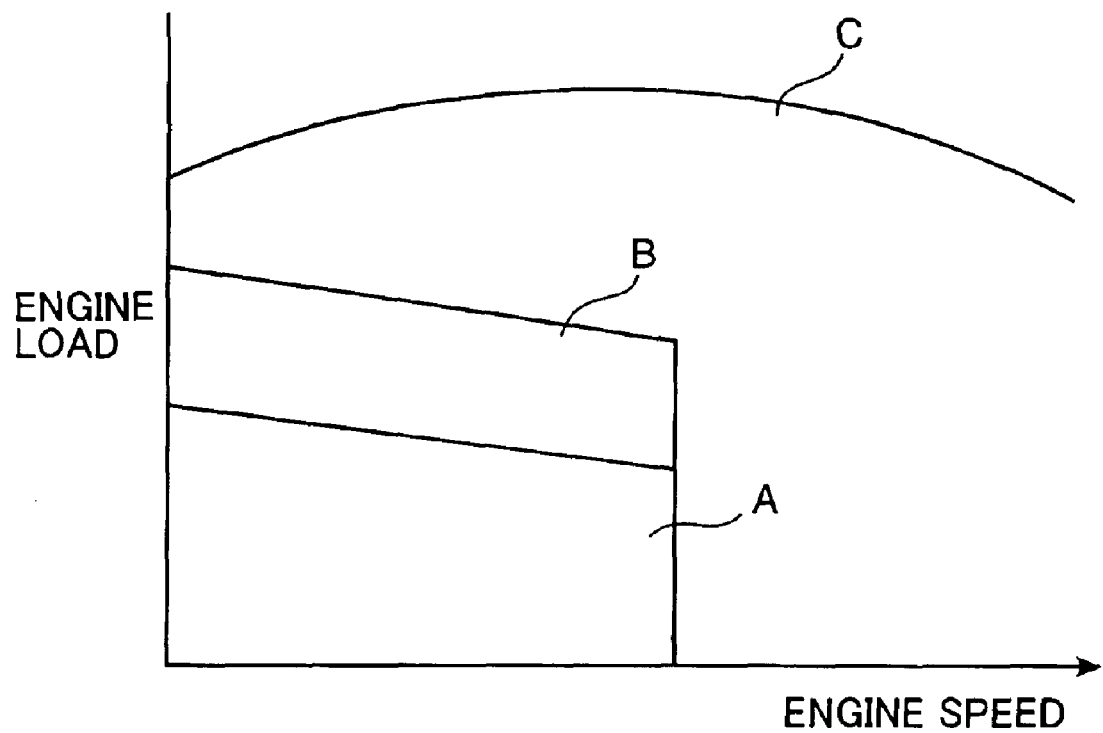
FIG. 4 is a graphical representation showing an example of operation areas in which control is executed according to an operation state.

As shown in FIG. 4, the operation-state judging means 41 is provided with a map used for control, showing the engine's operation areas divided into three. Herein, reference character A denotes a partial-load range on the side of low load & low speed (or a low load range); B, an operation area on the side of higher load than the range A (or a medium load range); and C, an operation area on the side of higher load & higher speed than these operation ranges A, B (or a high-load & high speed range). The operation-state judging means 41 judges which of the operation ranges A, B, C the engine's operation state (or the engine speed and load of the engine) belongs to. Herein, the engine's operation state can be checked with signals from the above described engine speed sensor 47, the accelerator opening-level sensor 48 and the like.

It should be noted that the term "range" and "area" for describing a category of operation or state of operation are interchangeably used in the following descriptions.

Based on the result of an judgment made by the operation-state judging means 41, a special operation mode is selected in the low load range A on the side of low load & low speed. Herein, in the special operation mode, the whole burnt gas discharged from the preceding cylinders 2A, 2D at the exhaust stroke is introduced into the following cylinders 2B, 2C at the intake stroke, and then, combustion is conducted. In the high-load & high speed range C on the side of high load & high-speed, an ordinary operation mode is selected in which combustion is individually conducted in each cylinder 2A to 2D. In the medium load range B, a medium operation mode is selected in which a part of the burnt gas discharged from the preceding cylinders 2A, 2D is introduced into the following cylinders 2B, 2C and the rest of the burnt gas is introduced into the exhaust passage 20.

The gas-route switching means 42 executes control of opening and closing the fresh-air introducing valve 18 and the switching valve 25 according to the judgment result of the operation-state judging means 41. Thereby, the gas-route switching means 42 executes control of the route on which burnt gas discharged from the preceding cylinders 2A, 2D flows and how much fresh air and burnt gas should be introduced into the following cylinders 2B, 2C.

Specifically, if the operation-state judging means 41 confirms that an operation state of the engine is within the low load range A, control of the special operation mode is executed. In this mode, the fresh-air introducing valve 18 is closed to stop introducing fresh air into the following cylinders 2B, 2C. Then, the switching valve 25 is set to the two-cylinder communicating position to introduce the entire burnt gas into the following cylinders 2B, 2C.

Next, if the operation-state judging means 41 confirms that an operation state of the engine is within the high-load & high speed range C, control of the ordinary operation mode is executed. In this mode, the fresh-air introducing valve 18 is opened to introduce the quantity of fresh air corresponding to the operation state into the following cylinders 2B, 2C. Then, the switching valve 25 is set to the two-cylinder non-communicating position to discharge the entire burnt gas into the exhaust passage 20.

Next, if the operation-state judging means 41 confirms that an operation state of the engine is within the medium load range B, control of the medium operation mode is executed. In this mode, the fresh-air introducing valve 18 is opened and the switching valve 25 is set to the neutral position. Thereby, both the burnt gas and fresh air are introduced into the following cylinders 2B, 2C. When control of this medium operation mode is executed, opening levels of the switching valve 25 can be changed so that the higher the engine load becomes, the more burnt gas can be introduced onto the side of the exhaust passage 20.

The intake air quantity controlling means 43 controls the opening level of the throttle valve 17 (or throttle opening levels) by controlling the actuator 17a. Specifically, it calculates the targeted quantity of intake air corresponding to an operation state using the map or the like and controls throttle opening levels according to the targeted quantity. In this case, in the low load range A which corresponds to the special operation mode, the opening level of the throttle valve 17 is adjusted so that combustion can be conducted in the following cylinders 2B, 2C. Herein, the ratio of excess air in burnt gas to be introduced from the preceding cylinders 2A, 2D to fuel to be supplied afresh is set to a lean air-fuel ratio, in the state where the introduction of intake air from the branch intake passage 16 into the following cylinders 2B, 2C is being cut off.

Specifically, in the low load range A, the opening level of the throttle valve 17 is controlled so that the quantity of air necessary for the combustion of fuel corresponding to a required torque for the two preceding and following cylinders can be supplied to the preceding cylinders (the first, fourth cylinders 2A, 2D). (Herein, that quantity of air represents a quantity of air which is necessary for the quantity of fuel for the two cylinders to make their mixture a stoichiometric ratio.) In the medium load range B where control of the medium operation mode is executed, control is executed so that the higher the load becomes, the more fresh air will be introduced into the following cylinders 2B, 2C by heightening the opening level of the fresh-air introducing valve 18.

The fuel-injection controlling means 44 is designed to control the quantity of fuel to be injected from the fuel injection valve 9 provided for each cylinder 2A to 2D and the timing of fuel injection according to the operation state of the engine. The ignition controlling means 45 is designed to execute control of the timing of ignition and other kinds of control such as putting a stop to ignition. The state of control of fuel injection by the fuel-injection controlling means 44 and the state of control of ignition timing by the ignition controlling means 45 can be changed according to the operation state. It depends upon where the operation state is, in the low load range A, the medium load range B, or the high-load & high speed range C, as shown in FIG. 4.

In other words, if the operation state is in the low load range A on the side of low load & low speed, as the control state in the special operation mode, the quantity of fuel to be injected is controlled so that the air-fuel ratio in the preceding cylinder can become a lean air-fuel ratio higher than a stoichiometric ratio, the timing of injection is set so that fuel can be injected at the compression stroke to stratify a mixture, and the timing of ignition is set so that forced ignition can be conducted around a compressive top dead center. On the other hand, in the following cylinders 2B, 2C, fuel is supplied to the burnt gas having a lean air-fuel ratio introduced from the preceding cylinders 2A, 2D, the quantity of fuel to be injected is controlled so that the burnt gas can turn into a mixture having substantially a stoichiometric ratio, the timing of injection is set so that fuel can be injected at the intake stroke, and forced ignition is stopped so that compressive self-ignition can be conducted.

In addition, in the low load range A where control of the special operation mode is executed, the total of the quantity of fuel to be injected into each pair of cylinders configured by the preceding cylinders 2A, 2D and the following cylinders 2B, 2C is adjusted to be equal to the quantity matching with the quantity of fresh air to be introduced into the preceding cylinders 2A, 2D so that the mixture can have a stoichiometric ratio. In addition, the ratio of the quantity of fuel to be injected into the preceding cylinders 2A, 2D to the quantity of fuel to be injected into the following cylinders 2B, 2C is controlled according to the operation state, so that knocking can be prevented from occurring and compressive self-ignition can be conducted properly.

Specifically, on the side of low load of the operation area A, the quantity of fuel to be injected into the preceding cylinders 2A, 2D is made substantially equal to, or slightly less than, the quantity of fuel to be injected into the following cylinders 2B, 2C. Thereby, the air-fuel ratio at the time of combustion in the preceding cylinders 2A, 2D becomes approximately twice as high as a stoichiometric ratio (A/F≈30, the excess air factor λ=around 2), or becomes more than twice as high as a stoichiometric ratio (A/F≈30, the excess air factor λ>2). As a result, the total quantity of fuel to be injected is set to a relatively small quantity because of the low load of the engine. Thus, on the side of low load where combustion loss tends to be easily caused in the following cylinders 2B, 2C, the quantity of fuel to be injected into the following cylinders 2B, 2C can be prevented from being set to an excessively small quantity, preventing combustion loss from occurring.

In addition, in the operation area A where control of the special operation mode is executed, the air-fuel ratio in the preceding cylinders 2A, 2D is changed from a lean air-fuel ratio toward a stoichiometric ratio according to the heightened engine load. Then, on the side of high load of the operation area A, the quantity of fuel to be injected into the preceding cylinders 2A, 2D is made more than the quantity of fuel to be injected into the following cylinders 2B, 2C. Thereby, the air-fuel ratio at the time of combustion in the preceding cylinders becomes less than twice as high as a stoichiometric ratio (the excess air factor $1<\lambda<2$). For example, control is executed so that A/F≈25, making the air-fuel ratio in the preceding cylinders 2A, 2D relatively rich compared with in the area on the side of low load of the operation area A. As a result, the total quantity of fuel to be injected is set to a relatively large quantity because of the high load of the engine. Thus, the temperature in the following cylinders 2B, 2C becomes excessively high, Thereby, in the area on the side of high load of the operation area A where knocking tends to be easily caused in the following cylinders 2B, 2C, a large quantity of burnt gas is introduced into the following cylinders 2B, 2C. This EGR effect helps prevent knocking from occurring.

In the medium load range B where both burnt gas and fresh air is introduced into the following cylinders 2B, 2C, the quantity of fuel to be injected is controlled so that combustion can be conducted at a stoichiometric ratio in the preceding cylinders 2A, 2D and the following cylinders 2B, 2C. When a shift is made from the low load range A where control of the special operation mode is executed to the medium load range B, before the opening level of the fresh-air introducing valve 18 becomes a predetermined value, control is executed during a transitional period when two cylinders are operating, in which fuel injection into the following cylinders 2B, 2C is stopped and combustion is conducted only in the preceding cylinders 2A, 2D.

On the other hand, if the engine's operation state is within the operation area C on the side of higher load &higher speed, as the state of control in the ordinary operation mode, control of the quantity of fuel to be injected is executed so that the air-fuel ratio in each cylinder 2A to 2D can be as high as, or lower than, a stoichiometric ratio. For example, the air-fuel ratio is made the stoichiometric ratio in most of the operation area C. In the operation area of the engine's full load and its vicinity, it is made richer than the stoichiometric ratio. In this case, control is executed so that fuel can be injected into each cylinder 2A to 2D at the intake stroke, the timing of fuel injection can be set to make the mixture uniform, and forced ignition can be conducted in each cylinder 2A to 2D.

The operation of the aforementioned unit according to this embodiment will be described with reference to FIG. 5 to FIG. 8. In the operation area A on the side of low load & low speed, the operation-mode controlling means configured by the gas-route switching means 42 and the like executes control of the special operation mode. In this mode, the fresh-air introducing valve 18 for introducing fresh air into the following cylinders 2B, 2C, is closed. Then, the switching valve 25 for switching the direction in which burnt gas discharged from the preceding cylinders 2A, 2D is introduced, is set to the two-cylinder communicating position. Thereby, the substantial flowing route of fresh air and gas becomes one shown in FIG. 6, on which the burnt gas discharged from the preceding cylinders (the first, fourth cylinders) 2A, 2D is introduced, in a state where it has been discharged, through the inter-cylindrical gas passage 22 into the following cylinders (the second, third cylinders) 2B, 2C, and only burnt gas discharged from the following cylinders 2B, 2C is introduced into the exhaust passage 20. In other words, this is a state in which two cylinders communicate with each other.

Figure 6:
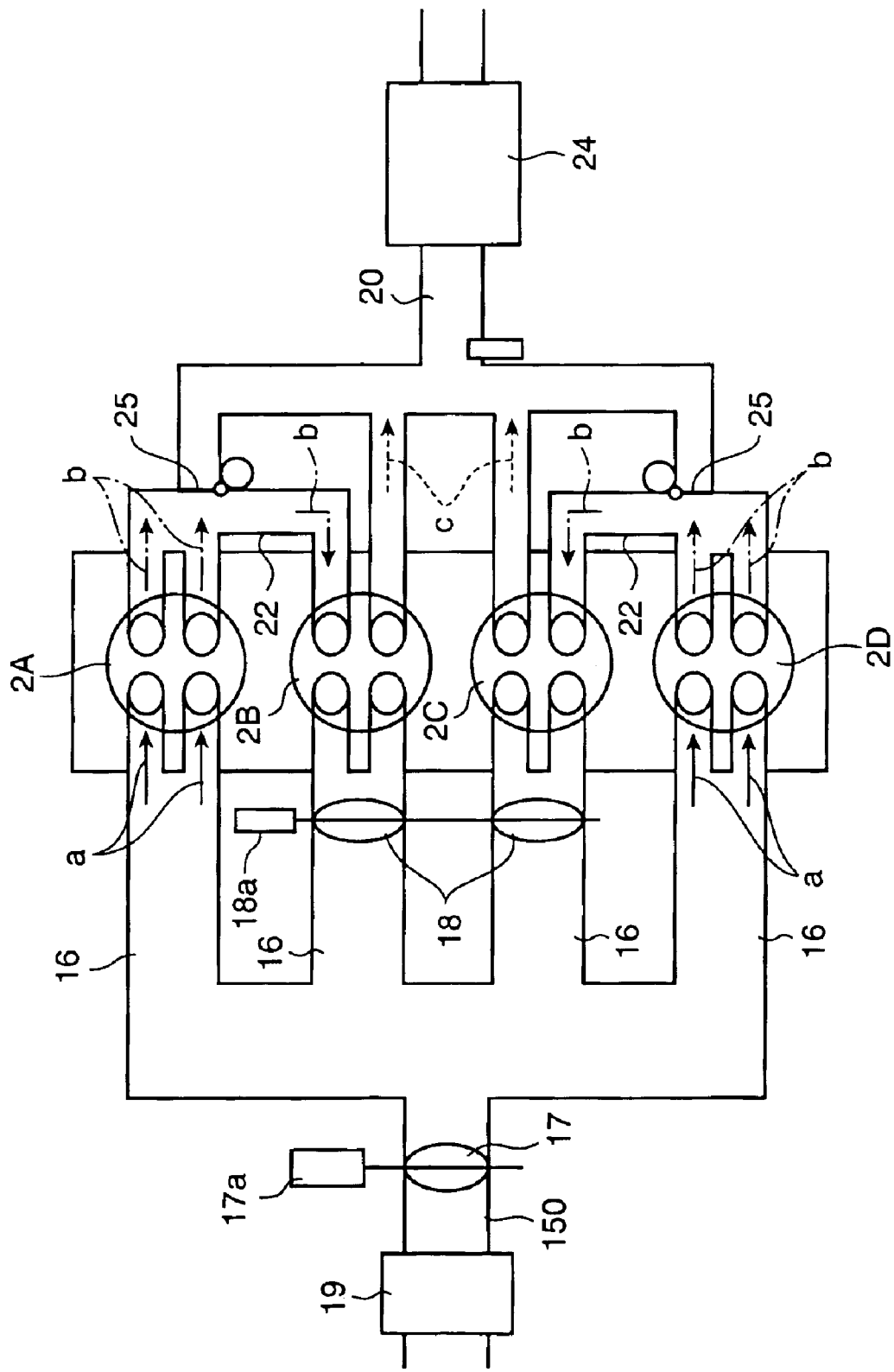
FIG. 6 is a schematic plan view showing a substantial route of flowing fresh air and gas in a light-load operation.

In this state, fresh air is introduced through the intake passage 150 into each preceding cylinder 2A, 2D at the intake stroke (see an arrow a in FIG. 6). Then, in the preceding cylinders 2A, 2D, the quantity of fuel to be injected is controlled so that the air-fuel ratio becomes higher than a stoichiometric ratio as well as becomes approximately, or less than, twice as high as the stoichiometric ratio. In this state, fuel is injected at the compression stroke, ignition is conducted in a predetermined ignition timing and stratified charge combustion is conducted at a lean air-fuel ratio (refer to FIG. 5).

During the period when the intake stroke in the preceding cylinder 2A, 2D overlaps with the exhaust stroke in the following cylinders 2B, 2C, burnt gas discharged from the preceding cylinders 2A, 2D is introduced through the inter-cylindrical gas passage 22 into the following cylinders 2B, 2C (see a white arrow in FIG. 5 and an arrow b in FIG. 6). Then, an air-fuel-ratio controlling means configured by the intake air quantity controlling means 43 and the fuel-injection controlling means 44 executes the following control in the following cylinders 2B, 2C. At first, fuel is supplied to the burnt gas having a lean air-fuel ratio introduced from the preceding cylinders 2A, 2D so as to set the mixture to a stoichiometric ratio. Then, fuel is injected at the intake stroke, and thereafter, rises in the pressure and temperature inside the combustion chamber induces compressive self-ignition around a top dead center at the compression stroke.

In this case, the burnt gas having a low temperature introduced from the preceding cylinders 2A, 2D is immediately introduced through the short inter-cylindrical gas passage 22 into the following cylinders 2B, 2C. Thereby, in the following cylinders 2B, 2C, the temperature inside the combustion chamber becomes high at the intake stroke. From this state, the pressure and temperature rise further at the compression stroke, and thereby, the temperature inside the combustion chamber continues to rise until self-ignition of the mixture could occur around a top dead center at the final period of the compression stroke. Besides, the burnt gas mentioned above is sufficiently stirred so that it can be uniformly distributed during the period when the burnt gas is discharged from the preceding cylinders 2A, 2D and then is introduced into the following cylinders 2B, 2C. The fuel injected into the following cylinders 2B, 2C at the intake stroke is also uniformly distributed over the whole combustion chamber before the completion of the final period of the compression stroke. This provides the mixture having a uniform distribution which fulfills the condition for ideal simultaneous compressive self-ignition. Then, combustion is conducted quickly because of simultaneous compressive self-ignition. This helps thermal efficiency be much improved.

In this way, in the preceding cylinders 2A, 2D, stratified charge combustion at a lean air-fuel ratio improves thermal efficiency. In addition, its negative intake air pressure becomes lower than that of an ordinary engine in which no stratified charge combustion is conducted. This allows its pumping loss to become smaller. On the other hand, in the following cylinders 2B, 2C, thermal efficiency becomes high because its air-fuel ratio is made an approximately stoichiometric ratio and compressive self-ignition is conducted in a state where a mixture is distributed uniformly. Furthermore, burnt gas pushed out of the preceding cylinders 2A, 2D is sent in, and thereby, its pumping loss becomes smaller than the preceding cylinders 2A, 2D. This helps thermal efficiency be much improved.

In the preceding cylinders 2A, 2D, its air-fuel ratio is made approximately twice as high as a stoichiometric ratio or is made a lean air-fuel ratio near that. Thereby, the quantity of $NO_x$ to be produced becomes relatively small. On the other hand, in the following cylinders 2B, 2C, burnt gas is introduced from the preceding cylinders 2A, 2D. This is equivalent to a large quantity of EGR. In addition, the reaction of oxygen to nitrogen can be avoided as much as possible when quick combustion is conducted through simultaneous compressive self-ignition. This contributes sufficiently to keeping $NO_x$ from being produced, making emission better.

In the low load range A, the air-fuel ratio in the following cylinders 2B, 2C is controlled so that the concentration of oxygen in exhaust gas discharged from the following cylinders 2B, 2C can become a value corresponding to a combustion state at a stoichiometric ratio. Thereby, combustion is conducted at a lean air-fuel ratio in the preceding cylinders 2A, 2D and only the burnt gas burned at the stoichiometric ratio in the following cylinders 2B, 2C is introduce into the exhaust passage 20 (refer to an arrow c in FIG. 6). Accordingly, there is no need to provide any lean $NO_x$ catalyst, which is necessary for a conventional lean-burn engine. In other words, you can sufficiently secure an exhaust-gas purification capability if you only use the three-way catalyst 24. Now that no lean $NO_x$ catalyst is needed, even when the quantity of $NO_x$ occluded by a lean $NO_x$ catalyst increases, it is unnecessary to make the air-fuel ratio rich temporarily for the purpose of removal and reduction of $NO_x$, This can avoid lessening the improvement of fuel efficiency and also prevent sulfurous poisoning which may be caused by a lean $NO_x$ catalyst from occurring.

In the medium load range B on a higher load side than the low load range A, control of the medium operation mode is executed. In this mode, the fresh-air introducing valve 18, which is provided in the fresh-air introduction passage (or the branch intake passage 16) communicating with the following cylinders 2B, 2C, is opened. As shown by arrows b1, d in FIG. 7, both the burnt gas and fresh air are introduced into the following cylinders 2B, 2C, fuel is supplied, and combustion is conducted in the following cylinders 2B, 2C. Thereby, the effect produced by introducing the burnt gas discharged from the preceding cylinders 2A, 2D into the following cylinders 2B, 2C on the improvement of fuel efficiency can be maintained, and at the same time, combustion is properly conducted in the following cylinders 2B, 2C.

Figure 7:
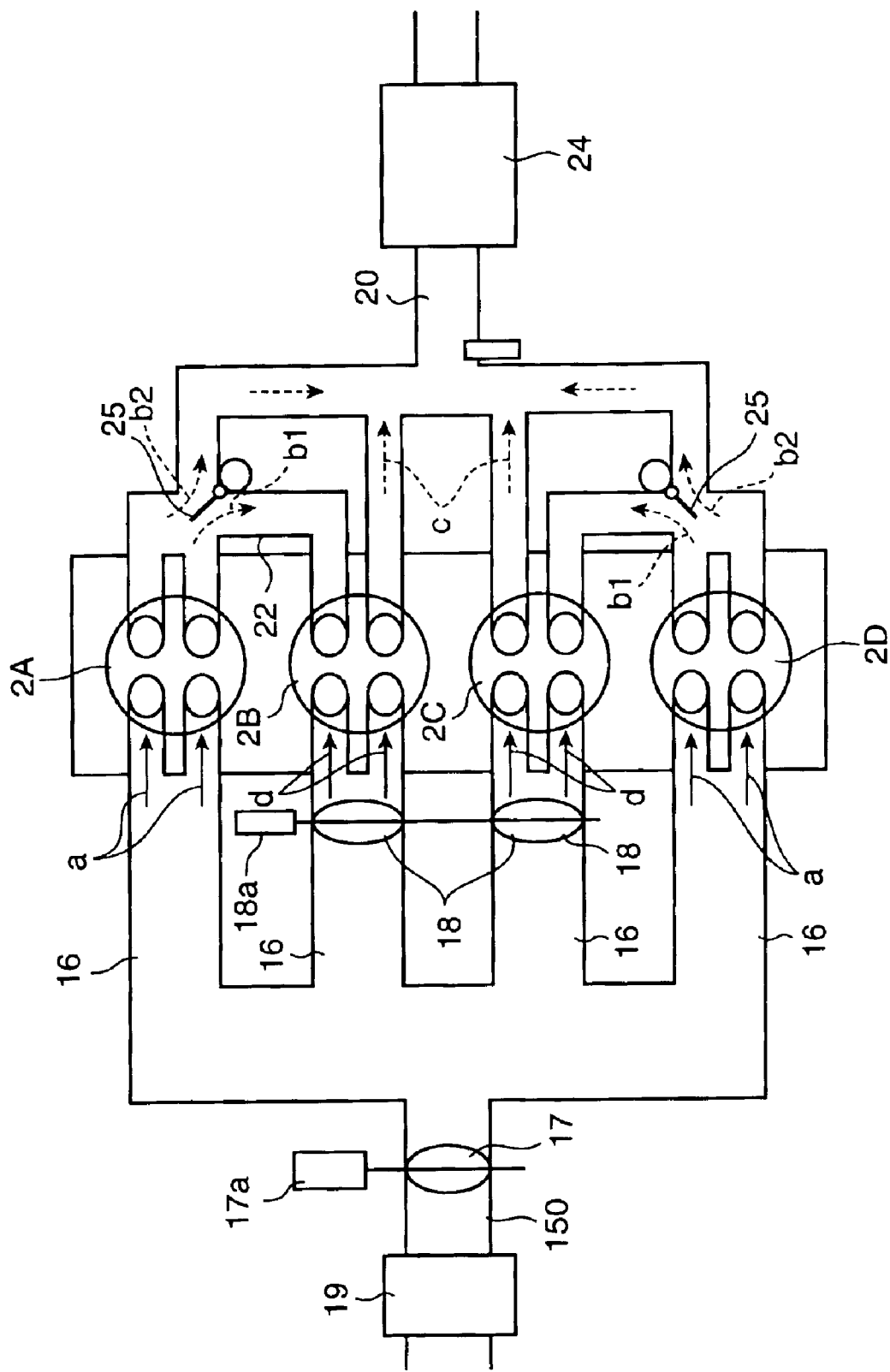
FIG. 7 is a schematic plan view showing a substantial route of flowing fresh air and gas in a medium load operation.

In other words, in the medium load range B, the burnt gas discharged from the preceding cylinders 2A, 2D is designed to be introduced into the following cylinders 2B, 2C (refer to the arrow b1 in FIG. 7). This allows pumping loss to reduce in the following cylinders 2B, 2C. In addition, compressive self-ignition is conducted without causing knocking in the following cylinders 2B, 2C, leading to an improvement of fuel efficiency. Furthermore, the air-fuel ratio in the preceding cylinders 2A, 2D is set to a stoichiometric ratio in the operation area B. This markedly reduces the quantity of oxygen existing in burnt gas discharged from the preceding cylinders 2A, 2D. In response to this, however, the fresh-air introducing valve 18 is opened to introduce fresh air into the following cylinders 2B, 2C (refer to the arrow d in FIG. 7). As a result, This makes good the shortage of fresh air in the following cylinders 2B, 2C to keep the state of combustion at a stoichiometric ratio in the following cylinders 2B, 2C.

As described according to the above described embodiment, in the low load range A of the engine where control of the special operation mode is executed, the air-fuel ratio in the preceding cylinders 2A, 2D is changed from a lean air-fuel ratio toward a stoichiometric ratio according to the heightened engine load. On the other hand, in the medium load range B on a higher load side than the operation area where the air-fuel ratio in the preceding cylinders 2A, 2D has become the stoichiometric ratio, the air-fuel ratio in the preceding cylinders 2A, 2D is set to a stoichiometric ratio. Furthermore, as shown by the arrow b1 and an arrow b2 in FIG. 7, control of the switching valve 25 is designed to be executed so that it can come to its neutral position at which the burnt gas discharged from the preceding cylinders 2A, 2D is distributed onto both the side of the exhaust passage 20 and the side of the inter-cylindrical gas passage 22. In this case, in the medium load range B, control is executed so that combustion can be conducted at a stoichiometric ratio in both the preceding cylinders 2A, 2D and the following cylinders 2B, 2C. Thereby, the engine's power output can be sufficiently secured. Besides, the burnt gas discharged from the preceding cylinders 2A, 2D as well as fresh air is introduced into the following cylinders 2B, 2C, This EGR effect helps effectively prevent knocking from occurring.

Figure 8:
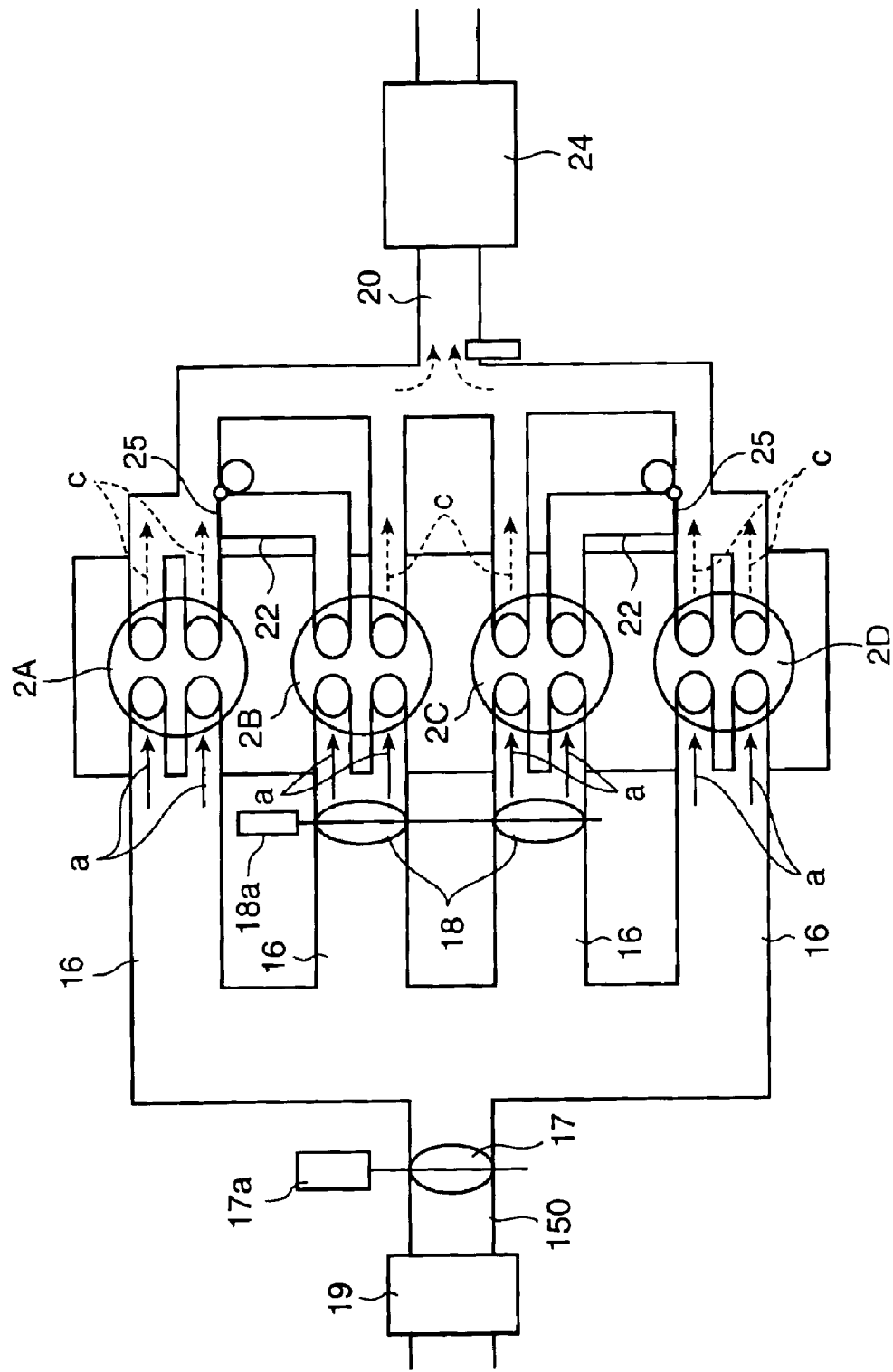
FIG. 8 is a schematic plan view showing a substantial route of flowing fresh air and gas in a high-load & high-speed operation.

In the operation area C on the side of higher load & higher speed than the medium load range B, as shown in FIG. 8, control of the ordinary operation mode is designed to be executed in which combustion is individually conducted in each cylinder 2A to 2D. In this mode, the fresh-air introducing valve 18 is opened, and as shown in FIG. 8, control of the switching valve 25 is executed so that the whole burnt gas discharged from the preceding cylinders 2A, 2D can be introduced onto the side of the exhaust passage 20. As a result, fresh air is introduced from the intake passage 150 into each cylinder 2A to 2D (refer to the arrow a in FIG. 8), and burnt gas is discharged from each cylinder 2A to 2D into the exhaust passage 20(refer to the arrow c in FIG. 8). In this case, the quantity of air to be sucked and the quantity of fuel to be injected is controlled so that combustion can be conducted at a stoichiometric ratio or an air-fuel ratio richer than the stoichiometric ratio in each cylinder 2A to 2D. Thereby, the engine's power-output performance can be sufficiently secured.

According to the above described embodiment, in the medium load range B, or in the operation area where burnt gas discharged from the preceding cylinders 2A, 2D is distributed onto both the side of the exhaust passage 20 and the side of the inter-cylindrical gas passage 22, opening levels of the switching valve 25 are designed to be changed so that the higher the engine load becomes, the more burnt gas can be introduced onto the side of the exhaust passage 20. As a result, when a shift is made from the medium load range B to the engine's high-load & high speed operation area C, the switching valve 25 can be shifted swiftly and smoothly from a neutral position to a position in which each cylinder becomes independent shown in FIG. 8.

Particularly, according to the above described embodiment, the switching valve 25 is configured by a turn-type valve made up of a butterfly valve which is disposed at the part where the inter-cylindrical gas passage 22 and the branch exhaust passage 21 of the exhaust passage 20 connected to the preceding cylinders 2A, 2D connect each other. Thereby, only by turning the switching valve 25 using an actuator 25b, control can be easily and properly executed in which the higher the engine load becomes, the more burnt gas is introduced onto the side of the exhaust passage 20. Herein, instead of the butterfly valve, the switching valve 25 may also be configured by any conventionally-known open-and-close valve made up of a rotary valve and the like.

As described according to the above described embodiment, when a shift is made from the low load range A where control of the special operation mode is executed to the medium load range B, before the opening level of the fresh-air introducing valve 18 becomes a predetermined value, fuel injection into the following cylinders 2B, 2C is stopped and combustion is conducted only in the preceding cylinders 2A, 2D, resulting in a state where two cylinders are operating. According to this configuration, in a state where fresh air in the following cylinders 2B, 2C is running short because of a response delay at the time when the fresh-air introducing valve 18 is opened, combustion loss which may be caused by fuel injection into the following cylinders 2B, 2C can be avoided. As a result, fuel efficiency can be prevented from lowering. In addition, when a shift is made from the state of control of the special operation mode to the state of control of the medium operation mode, any torque shock can be prevented from occurring, making the operation-state shift smooth.

Figure 9:
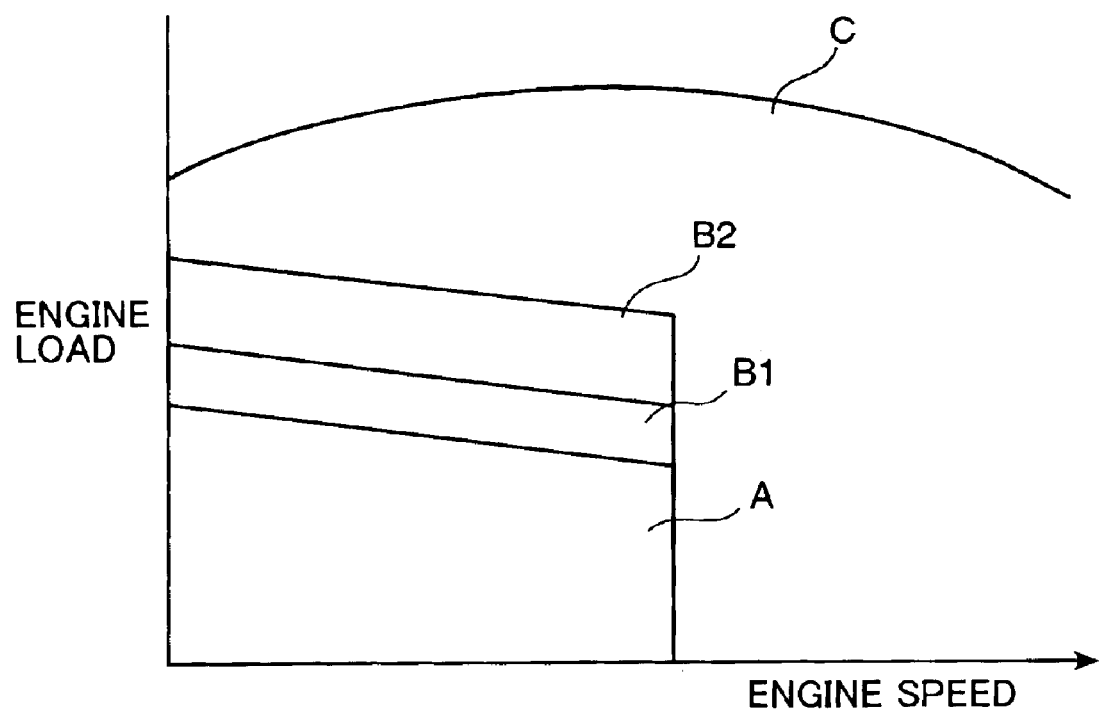
FIG. 9 is a graphical representation showing another example of operation areas in which control is executed according to an operation state.

According to the above described embodiment, control of the two-cylinder operation state in transition is designed to be executed over a predetermined period at the time when a shift is made from the low load range A to the medium load range B. However, this configuration may also be replaced with the following one shown in FIG. 9. According to that, in a first medium load range B1 on a higher-load side than the low load range A, both the burnt gas and fresh air are introduced into the following cylinders 2B, 2C by opening the fresh-air introducing valve 18 which is provided in the fresh-air introduction passage (or the branch intake passage 16) communicating with the following cylinders 2B, 2C. In this state, fuel injection into the following cylinders 2B, 2C is stopped and combustion is conducted only in the preceding cylinders 2A, 2D. In this way, control of the two-cylinder operation mode may also be executed. In a second medium load range B2 on a higher-load side than the first medium load range B1, both the burnt gas and fresh air are introduced into the following cylinders 2B, 2C by opening the fresh-air introducing valve 18 which is provided in the fresh-air introduction passage (or the branch intake passage 16) communicating with the following cylinders 2B, 2C. In addition, fuel is supplied and combustion is conducted in the following cylinders 2B, 2C. In this way, control of the medium operation mode may also be executed.

According to the above described embodiment, in the medium load range B where control of the medium operation mode is executed, the air-fuel ratio in the preceding cylinders 2A, 2D is set to a stoichiometric ratio. In addition, as shown by the arrows b1, b2 in FIG. 7, control of the switching valve 25 is designed to be executed so that it can come to its neutral position at which the burnt gas discharged from the preceding cylinders 2A, 2D is distributed onto both the side of the exhaust passage 20 and the side of the inter-cylindrical gas passage 22. This configuration may also be replaced with the following. According to that, in the medium load range B, the entire burnt gas discharged from the preceding cylinders 2A, 2D is introduced onto the side of the inter-cylindrical gas passage 22 and is introduced into the following cylinders 2B, 2C. Then, fresh air, together with the burnt gas, is introduced into the following cylinders 2B, 2C by opening the fresh-air introducing valve 18. Thereby, combustion may also be conducted by setting the air-fuel ratio in the following cylinders 2B, 2C to a stoichiometric ratio.

According to this configuration, in the medium load range B, combustion is conducted by setting the air-fuel ratio in the preceding cylinders 2A, 2D to a lean air-fuel ratio which is higher than a stoichiometric ratio. This improves thermal efficiency and reduces pumping loss, helping improve fuel efficiency. In addition, only exhaust gas burned at a stoichiometric ratio in the following cylinders 2B, 2C is introduced into the exhaust passage 20. Therefore, without any lean $NO_x$ catalyst, sufficient exhaust purification capabilities can be obtained by using a three-way catalyst or an oxidation catalyst.

Furthermore, the unit according to the present invention can also be applied to any multi-cylinder engines, not limited to a four-cylinder engine. For example, if you use a six-cylinder engine or the like, there is no occasion when an exhaust stroke of one cylinder overlaps fully with an intake stroke of another cylinder. In such a case, however, an exhaust stroke of one cylinder precedes an intake stroke of another cylinder. You may regard the two cylinders whose strokes partially overlap each other as a pair of cylinders; preceding and following ones.

ADVANTAGES OF THE INVENTION

As described above, in the control unit according to the present invention, if a special operation mode is set in a partial load range of an engine, combustion is conducted at a lean air-fuel ratio in a preceding cylinder of the two cylinders whose exhaust and intake strokes overlap each other. In a following cylinder, fuel is supplied to the burnt gas having the lean air-fuel ratio introduced from the preceding cylinder into the following cylinder, and combustion is conducted by setting the air-fuel ratio to a stoichiometric ratio. Thereby, combustion is conducted at a lean air-fuel ratio in the preceding cylinder, heightening thermal efficiency and reducing pumping loss. In the following cylinder, pumping loss is reduced. As a result, fuel efficiency can be improved.

Especially, in the control unit according to the present invention, on a higher load range than the partial load range, the fresh-air introducing valve is designed to be opened to introduce fresh air into the following cylinder. According to this configuration, burnt gas discharged from the preceding cylinder is introduced into the following cylinder. This helps maintain the good effect on fuel efficiency and also make good the shortage of fresh air in the following cylinder. As a result, combustion can be properly conducted in the following cylinder.

In summary, according to the present invention, a control unit for a multi-cylinder spark ignition-type engine according to a first aspect of the present invention, in which a combustion cycle of each cylinder has a predetermined phase difference, comprises:

an inter-cylindrical gas passage between a pair of cylinders, an exhaust stroke of one of the cylinders and an intake stroke of the other of the cylinders overlapping each other, and through the inter-cylindrical gas passage, burnt gas discharged from the preceding cylinder at the exhaust stroke being introduced into the following cylinder at the intake stroke;

a switching valve for switching the direction in which the burnt gas of the preceding cylinder is introduced, from the side of an exhaust passage to the side of the inter-cylindrical gas passage and vice versa;

a fresh-air introducing valve for introducing fresh air into the following cylinder by opening and closing a fresh-air introduction passage;

an operation-mode controlling means for: executing control of a special operation mode in a partial load range of the engine, in the special operation mode, the fresh-air introducing valve being closed and the switching valve being controlled so that the whole burnt gas discharged from the preceding cylinder can be introduced onto the inter-cylindrical gas-passage side, thereby the two cylinders being kept connected, the air-fuel ratio in the preceding cylinder becoming a lean air-fuel ratio higher than a stoichiometric ratio and combustion being conducted, and fuel being supplied to the burnt gas having the lean air-fuel ratio introduced from the preceding cylinder into the following cylinder to conduct combustion in the following cylinder; and executing control of a medium operation mode in a higher load range than the partial load range, in the medium operation mode, the fresh-air introducing valve being opened to introduce both the burnt gas and fresh air into the following cylinder and fuel being supplied to conduct combustion in the following cylinder; and an air-fuel-ratio controlling means for controlling the air-fuel ratio in the following cylinder so that the concentration of oxygen in exhaust gas discharged from the following cylinder can be a value corresponding to a combustion state at a stoichiometric ratio.

According to the first aspect of the present invention, in a partial load range of the engine, fuel control of the special operation mode is executed with the two cylinders being connected. Thereby, in the preceding cylinder, a lean burn improves thermal efficiency and reduces pumping loss, helping improve fuel efficiency. In the following cylinder, fuel is supplied into burnt gas introduced from the preceding cylinder until it reaches a stoichiometric ratio, and then, combustion is conducted at the stoichiometric ratio. This, at least, allows pumping loss to reduce, thus improving fuel efficiency. Since the exhaust gas burned at the stoichiometric ratio is introduced into the exhaust passage, there is no need to use any lean NO$_x$ catalyst. Sufficient exhaust conversion capabilities can be obtained by using a three-way catalyst or an oxidation catalyst. On the other hand, in a higher load range than the partial load range, the fresh-air introducing valve is opened, and then, fresh air is introduced into the following cylinder. This makes good the shortage of fresh air in the following cylinder, helping conduct combustion properly in the following cylinder.

In a control unit for the spark ignition-type engine according to a second aspect of the present invention, according to the above described first aspect, in the partial load range of the engine in which control of the special operation mode is executed, an increase in an engine load changes the air-fuel ratio in the preceding cylinder from a lean air-fuel ratio toward a stoichiometric ratio; and control of the medium operation mode is executed on a higher load side than an operation area where the air-fuel ratio in the preceding cylinder has become the stoichiometric ratio, in the medium operation mode, the air-fuel ratio in the preceding cylinder being set to the stoichiometric ratio and the switching valve being controlled so as to come to a neutral position where the burnt gas discharged from the preceding cylinder is distributed to both the exhaust-passage side and the inter-cylindrical gas-passage side.

According to this configuration, in a higher load range than the partial load range in which control of the special operation mode is executed, control of the air-fuel ratio is executed so that combustion in both the preceding cylinder and the following cylinder is conducted at a stoichiometric ratio. Thereby, the engine's power output can be sufficiently secured, and burnt gas discharged from the preceding cylinder as well as fresh air is introduced into the following cylinder. This EGR effect helps effectively prevent knocking from occurring.

In a control unit for the spark ignition-type engine according to a third aspect of the present invention, according to the above described second aspect, control of an ordinary operation mode in which combustion is individually conducted in each cylinder is executed in a higher-load or higher speed operation area than an operation area in which control of the medium operation mode is executed; and in the ordinary operation mode, the fresh-air introducing valve is opened and the switching valve is controlled so that the whole burnt gas discharged from the preceding cylinder can be introduced onto the exhaust-passage side.

According to this configuration, at the point of time when a shift is made to a higher-load operation area than the middle operation area in which burnt gas discharged from the preceding cylinder, together with fresh air, is introduced into the following cylinder, a shift is made to control of an ordinary operation mode in which combustion is individually conducted in each cylinder. Thereby, the engine's power output can be sufficiently secured.

In a control unit for the spark ignition-type engine according to a fourth aspect of the present invention, according to the above described third aspect, in an operation area in which control of the medium operation mode is executed, opening levels of the switching valve are changed so that the quantity of burnt gas introduced onto the exhaust-passage side can increase gradually according to an increase in an engine load.

According to this configuration, if the operation area of the engine shifts from the middle operation area to the higher-load or higher speed operation area, opening levels of the switching valve are swiftly changed. Thereby, a shift can be smoothly made from the state of control of the special operation mode in which burnt gas discharged from the preceding cylinder, together with fresh air, is introduced into the following cylinder to the state of control of the ordinary operation mode in which combustion is individually conducted in each cylinder.

In a control unit for the spark ignition-type engine according to a fifth aspect of the present invention, according to the above described fourth aspect, the switching valve is configured by a turn-type valve disposed at a part where the inter-cylindrical gas passage and the exhaust passage are connected.

According to this configuration, using such a simple configuration, control can be properly executed of gradually increasing the quantity of burnt gas introduced onto the exhaust-passage side according to an increase in an engine load.

This application is based on Japanese patent application No. 2002-287802, filed in Japan Patent Office on Sep. 30, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control unit for a multi-cylinder spark ignition-type engine in which a combustion cycle of each cylinder has a predetermined phase difference, said engine including: an inter-cylindrical gas passage between a pair of cylinders, an exhaust stroke of one of the cylinders and an intake stroke of the other of the cylinders overlapping each other, and through the inter-cylindrical gas passage, burnt gas discharged from the preceding cylinder at the exhaust stroke being introduced into the following cylinder at the intake stroke; a switching valve for switching the direction in which the burnt gas of the preceding cylinder is introduced, from the side of an exhaust passage to the side of the inter-cylindrical gas passage and vice versa; and a fresh-air introducing valve for introducing fresh air into the following cylinder by opening and closing a fresh-air introduction passage; said control unit comprising:

an operation-mode controlling means for executing control of a special operation mode in a partial load range of the engine, in said special operation mode, the fresh-air introducing valve being closed and the switching valve being controlled so that the whole burnt gas discharged from the preceding cylinder can be introduced into the side of the inter-cylindrical gas passage, thereby the two cylinders being kept connected, the air-fuel ratio in the preceding cylinder becoming a lean air-fuel ratio, higher than a stoichiometric ratio and combustion being conducted, and fuel being supplied to the burnt gas having the lean air-fuel ratio introduced from the preceding cylinder into the following cylinder to conduct combustion in the following cylinder; and executing control of a medium operation mode in a higher load range than the partial load range, in said medium operation mode, the fresh-air introducing valve being opened to introduce both the burnt gas and fresh air into the following cylinder and fuel being supplied to conduct combustion in the following cylinder; and an air-fuel-ratio controlling means for controlling the air-fuel ratio in the following cylinder so that the concentration of oxygen in exhaust gas discharged from the following cylinder can be a value corresponding to a combustion state at a stoichiometric ratio.

2. The control unit for the spark ignition-type engine according to claim 1, wherein in the partial load range of the engine in which control of the special operation mode is executed, an increase in an engine load changes the air-fuel ratio in the preceding cylinder from a lean air-fuel ratio toward a stoichiometric ratio; and control of the medium operation mode is executed on a higher load side than an operation area where the air-fuel ratio in the preceding cylinder has become the stoichiometric ratio, in the medium operation mode, the air-fuel ratio in the preceding cylinder being set to the stoichiometric ratio and the switching valve being controlled so as to come to a neutral position where the burnt gas discharged from the preceding cylinder is distributed to both the exhaust-passage side and the inter-cylindrical gas-passage side.

3. The control unit for the spark ignition-type engine according to claim 2, wherein:

control of an ordinary operation mode in which combustion is individually conducted in each cylinder is executed in a higher-load or higher speed operation area than an operation area in which control of the medium operation mode is executed; and in the ordinary operation mode, the fresh-air introducing valve is opened and the switching valve is controlled so that the whole burnt gas discharged from the preceding cylinder can be introduced onto the exhaust-passage side.

4. The control unit for the spark ignition-type engine according to claim 3, wherein in an operation area in which control of the medium operation mode is executed, an opening level of the switching valve is changed so that the quantity of burnt gas introduced into the exhaust-passage side can increase gradually according to an increase in an engine load.

5. The control unit for the spark ignition-type engine according to claim 4, wherein the switching valve is configured by a turn-type valve disposed at a part where the inter-cylindrical gas passage and the exhaust passage are connected.

* * * * *